US005639147A

United States Patent [19]
Hill et al.

[11] Patent Number: 5,639,147
[45] Date of Patent: Jun. 17, 1997

[54] VARIABLE OFF-SET FULL FACE WHEEL AND METHOD AND APPARATUS FOR MAKING THE SAME

[75] Inventors: Ross S. Hill, Lansing; Charles E. Kier, Grand Ledge, both of Mich.

[73] Assignee: Motor Wheel Corporation, Lansing, Mich.

[21] Appl. No.: 560,905

[22] Filed: Nov. 20, 1995

Related U.S. Application Data

[62] Division of Ser. No. 255,110, Jun. 7, 1994, Pat. No. 5,517,759, which is a continuation of Ser. No. 940,502, Sep. 4, 1992, abandoned.

[51] Int. Cl.$^6$ ............................................. B60B 3/00
[52] U.S. Cl. ................................. 301/63.1; 301/95
[58] Field of Search ........................... 301/63.1, 95, 96, 301/97, 98

[56] References Cited

U.S. PATENT DOCUMENTS

| | | |
|---|---|---|
| D. 197,840 | 3/1964 | Deaver . |
| D. 199,394 | 10/1964 | Deaver et al. . |
| 3,506,311 | 4/1970 | Nobach . |
| 4,280,426 | 7/1981 | Swan . |
| 4,610,482 | 9/1986 | Overbeck et al. . |
| 4,963,083 | 10/1990 | Stalter, Sr. et al. . |
| 5,188,429 | 2/1993 | Heck et al. ................... 301/63.1 |
| 5,257,455 | 11/1993 | Iwatsuki ..................... 301/63.1 X |
| 5,345,676 | 9/1994 | Ashley, Jr. ................... 301/63.1 X |
| 5,435,633 | 7/1995 | Jaskierny ...................... 301/63.1 |

FOREIGN PATENT DOCUMENTS 445642   4/1936   United Kingdom .

OTHER PUBLICATIONS

Autobody Stamping Applications & Analysis, SAE SP–897 pp. 41–49.

Metals Handbook, vol. 4, p. 182 (Ex. 253).

*Primary Examiner*—Russell D. Stormer
*Attorney, Agent, or Firm*—Barnes, Kisselle, Raisch, Choate, Whittemore & Hulbert, P.C.

[57] ABSTRACT

An automotive passenger vehicle full face wheel having a sheet metal disc-rim including a central bolt circle mounting portion, an intermediate portion extending generally radially outwardly therefrom and an outer peripheral portion surrounding the intermediate portion having an outboard tire bead retaining flange. The rim part includes a rim edge portion extending circumferentially continuously adjacent the rim outboard lead seat and permanently joined by a continuous weld to the disc-rim outer peripheral portion. In a first embodiment the disc-rim intermediate portion has an outboard-concave bowl shape with a radius of curvature ranging about 10.50 to about 11.00 inches. The bolt circle mounting portion has pad surfaces defining a wheel mounting plane and a frusto conical transition portion outboard divergent therefrom joined integrally to the bowl portion by an annular bend portion spaced axially from the mounting plane about 0.75 to 1.50 inches. In a second embodiment the disc-rim intermediate bowl portion is integrally joined to the outer peripheral portion at a bend junction radially spaced inwardly from the rim edge flange portion about 14.30 to 13.71 inches. The disc-rim bowl portion has a radius of curvature of about 10.50 to 11.00 inches and the wheel offset dimension is about 1.0 to 1.25 inches.

4 Claims, 4 Drawing Sheets

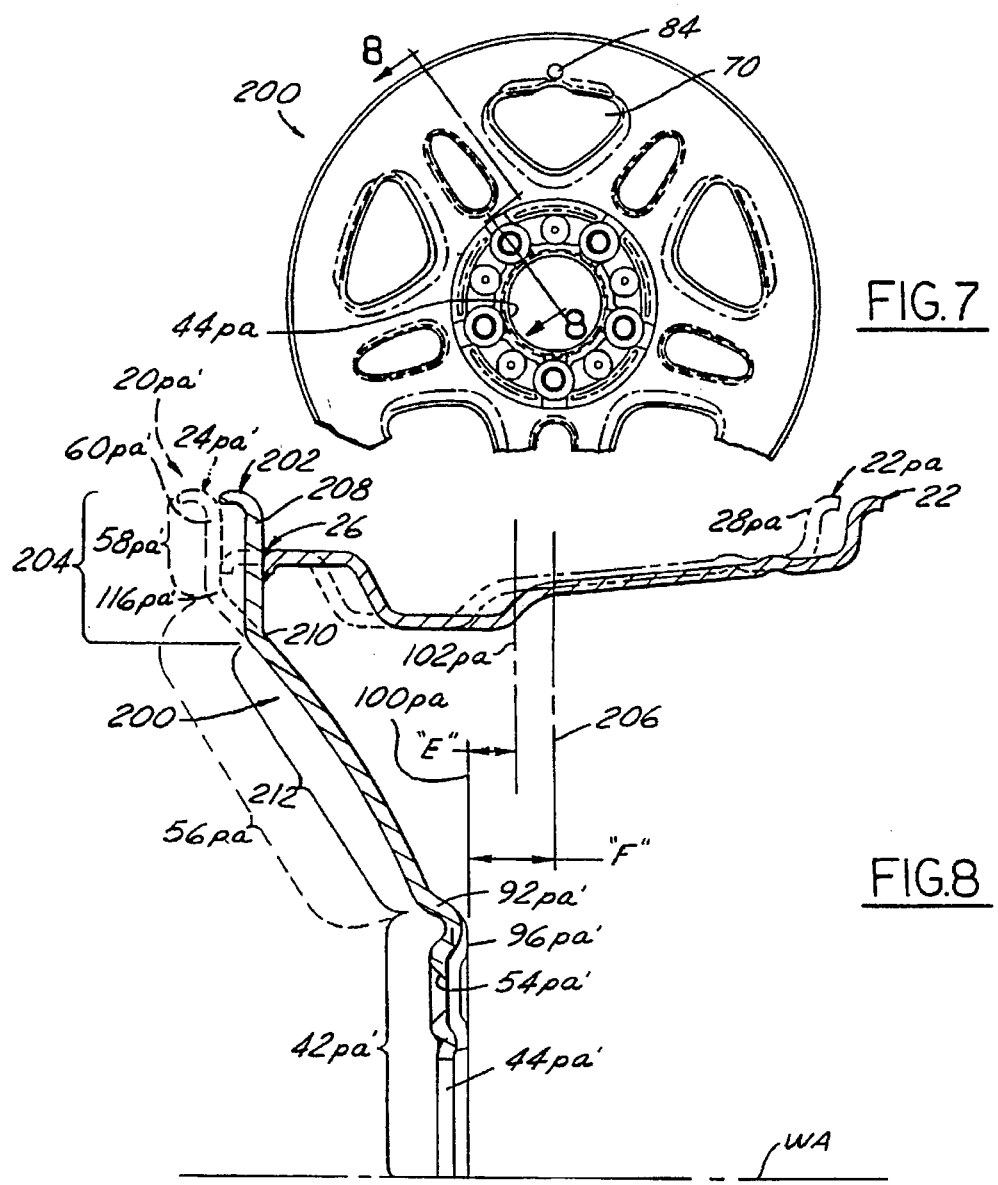
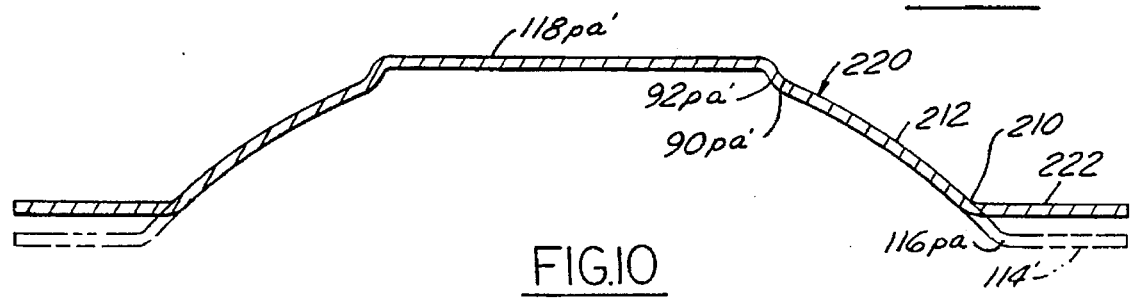

VARIABLE OFF-SET FULL FACE WHEEL AND METHOD AND APPARATUS FOR MAKING THE SAME

This is a divisional of application(s) Ser. No. 08/255,110 filed on Jun. 7, 1994 now U.S. Pat. No. 5,517,759 issued May 21, 1996 which is a continuation of Ser. No. 07/940,502, filing date Sep. 4, 1992 now abandoned.

FIELD OF THE INVENTION

The present invention relates to vehicle wheels, and more particularly to automotive passenger vehicle wheels of the so-called "full-face" type fabricated from sheet metal, and methods and apparatus for manufacture thereof.

BACKGROUND OF THE INVENTION

For well over sixty years, wheels for automotive passenger vehicles (which includes light trucks as well as passenger cars) adapted for button-hook mounting of pneumatic tires thereon have been fabricated from sheet metal, usually steel, to provide a rolled one-piece rim with a drop-center well to which is affixed a disc (also termed "body" or "spider") adapted for mounting the wheel to the hub or other wheel mounting part of the vehicle. Usually the rim is made with both inboard and outboard bead seats and associated tire bead retaining flanges, and the disc is secured to the base of the drop-center well of the rim. Such wheels are well suited for use with tubeless tires and are in extensive use today as so-called "base wheels" or "plain-Jane" wheels. Their lack of aesthetically pleasing appearance is often compensated for by the provision of removably attached decorative hub caps, wheel covers and/or trim rings, as is well known in the art.

Such wheels may also be aesthetically enhanced if used as a "backbone" of composite plastic and steel styled wheels such as those extensively commercialized and sold under the trademark "POLYCAST" by the assignee of applicants herein, Motor Wheel Corporation, Lansing, Mich. Such wheels have a decorative plastic body permanently affixed to the outboard (also termed "street-side" or "curb-side") of the steel "backbone" as set forth in more detail, for example, in U.S. Pat. No. 4,963,083 and the patents cited therein.

Another passenger car wheel development commercially employed to enhance the appearance of steel wheels, initiated in the early 1960's by applicants' assignee herein, Motor Wheel Corporation, is the so-called "styled" steel wheel wherein the disc is progressively formed utilizing progressive deep-draw die transfer press forming operations to impart a decorative, highly contoured configuration to the disc. For the most part, such styled wheels comprise a conventional disc and rim assembly of the aforementioned "base wheel" type wherein the disc is affixed to the drop-center base of a full rim section (i.e., dual beads and associated dual tire-retaining flanges). Example of such styled steel wheel constructions are shown in U.S. Design Pat. Nos. 197,840 and 199,394.

Another effort to enhance the appearance of automotive wheels has been the development of aluminum styled wheels made by such processes as sand casting, permanent die casting, forging, etc., and finished by machining. Such wheels may have the outboard tire bead seat and retaining flange joined integrally with the disc, to impart a so-called "full-face look", and this portion in turn joined with the remainder of the rim inboard half in a two-piece or one-piece wheel assembly as exemplified by the Nobauk U.S. Pat. No. 3,506,311. Although such aluminum full-face styled wheels have gained increased popularity in the last decade, they represent a relatively costly solution to the problem of enhancing wheel styling since they typically exceed the factory cost of the plain-Jane wheels by about three to five times.

A more recent passenger vehicle wheel development, initiated in the 1980's by applicants assignee herein, Motor Wheel Corporation, is the so-called "full-face" sheet metal (e.g. steel) wheel, wherein the disc extends generally radially outwardly around its outer periphery to also form the outboard tire bead retaining flange to achieve the full-face appearance. A modified dual bead seat-single bead-retaining-flange rim is formed adjacent its outboard edge to provide the outboard bead seat, and the rim free edge is formed to provide a radially in-turned flange which is welded to the inboard face of the full-face disc part. A commercially successful example of such a full-face wheel is that disclosed and claimed Overbeck et al in U.S. Pat. No. 4,610,482, also assigned to the assignee herein. Such sheet metal full-face wheels enable the wheel designer to provide a more unique and distinct full-face styling appearance to the outboard face of the wheel at lower cost than cast or forged aluminum wheels while also obviating the need for attaching ornamental wheel covers and their attendant problems and cost.

These full-face sheet metal wheels of the Overbeck et al U.S. Pat. No. 4,610,482 also meet the increased off-set requirement of front wheel drive systems while also satisfying such other demanding parameters as a strong, reliable air-tight circumferential weld joint and a two-piece wheel assembly capable of meeting severe fatigue life specifications required on current O.E.M. automotive vehicle wheels. Many millions of such wheels have been made and sold and are currently in use on automotive passenger vehicles (both passenger cars and light trucks) of both U.S. and foreign manufacture.

However, one problem remaining with such full-face sheet metal wheel constructions arises from the inherent nature of the disc and rim construction wherein the disc provides the outboard tire-bead-retaining flange. This imparts a fixed (non-variable) wheel off-set for any particular full-face wheel part design. By contrast, a "plain-Jane" or "base wheel construction", because of the telescopic-type press-fit and welded attachment of the peripheral disc flange to the drop-center well of the dual bead rim, permits off-set specifications for a given wheel part to be varied relatively easily without changing the other parameters of the given wheel design. However, hitherto, if a given full-face sheet metal wheel design were desired to be retained unchanged, and yet adapted to fit different models of a vehicle having differing wheel off-set requirements, the design of the disc/outboard rim flange part of the wheel had to be reconfigured. This in turn entailed a complete re-tooling of the progressive die forming equipment utilized in the transfer press to make this part, thereby resulting in high tooling change costs and long lead times involved in the manufacture of such modified tooling as well as installation and try-out of the same. This was true even though the wheel disc/outboard rim flange part was not to be noticably changed in its outboard appearance from the styling standpoint because the O.E.M. customer desired a full-face wheel having the same style or appearance for a range of similar vehicle models having differing wheel off-set requirements.

Accordingly, it is an object of the present invention to provide an improved full-face vehicle wheel construction, and improved method and improved apparatus for making the same from sheet metal, which overcome the aforementioned problems in an economical and reliable manner.

3

Other objects, as well as features and advantages of the present invention, will become apparent from the following detailed description taken in conjunction with the accompanying drawings (which are scaled from engineering drawings unless otherwise noted), wherein.

Figure 1:
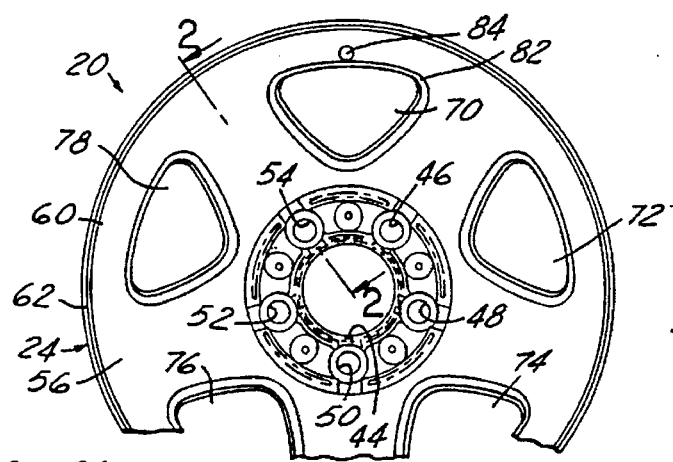
FIG. 1 is a fragmentary elevational view of the outboard side of an exemplary, but preferred, first embodiment of a vehicle wheel constructed in accordance with the present invention.
Figure 2:
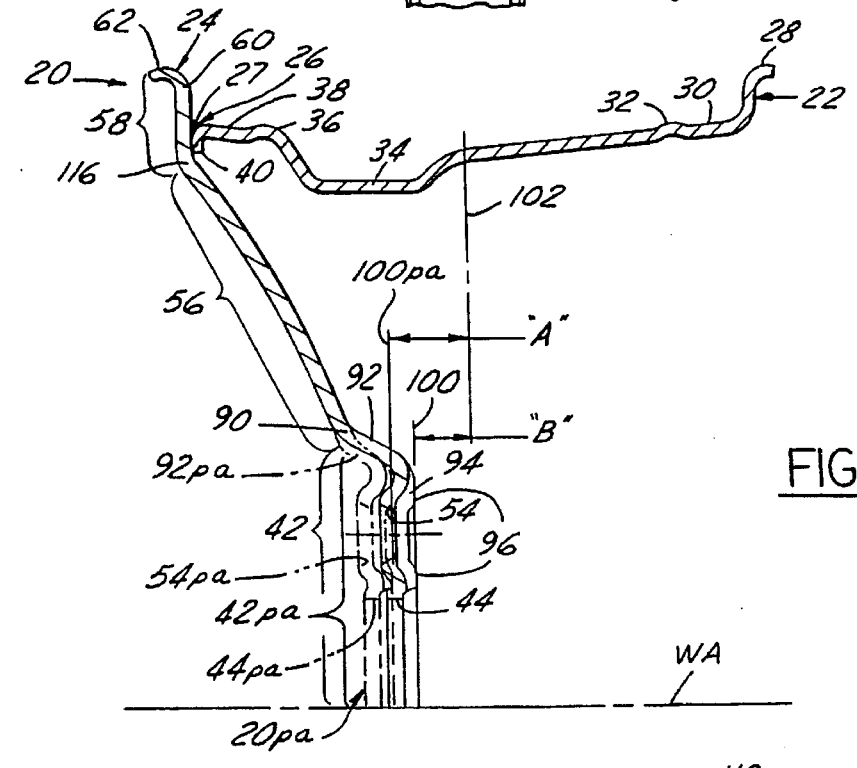
FIG. 2 is a cross-sectional view taken on the line 2—2 of FIG. 1, with the contour of a prior art wheel being illustrated in phantom except where superimposed in coincidence with the wheel of the invention shown in solid lines in FIG. 2.
Figure 3:
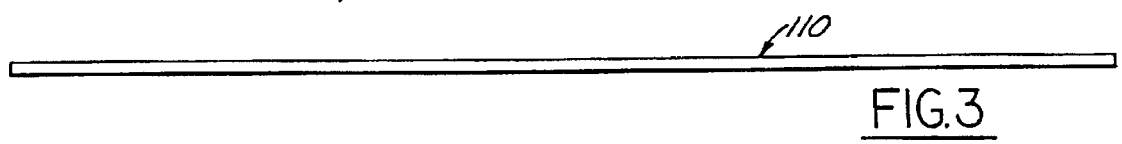
FIG. 3 is a side elevational view of a flat circular blank of sheet steel illustrating the starting material employed in the method of the invention to form the full face disc-rim part of the wheel of FIGS. 1 and 2 of the invention.
Figure 4:
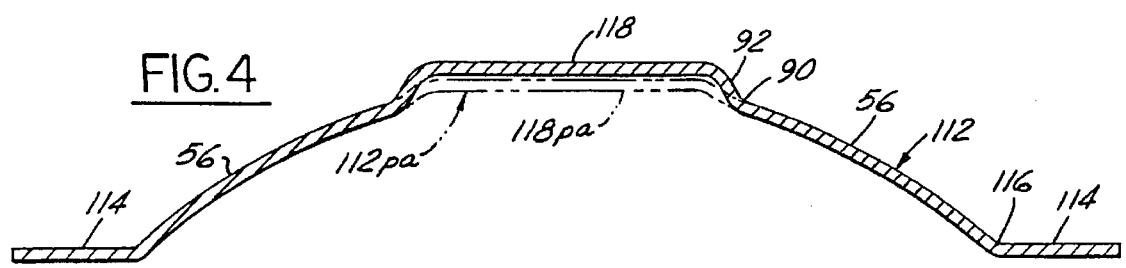
Figure 5:
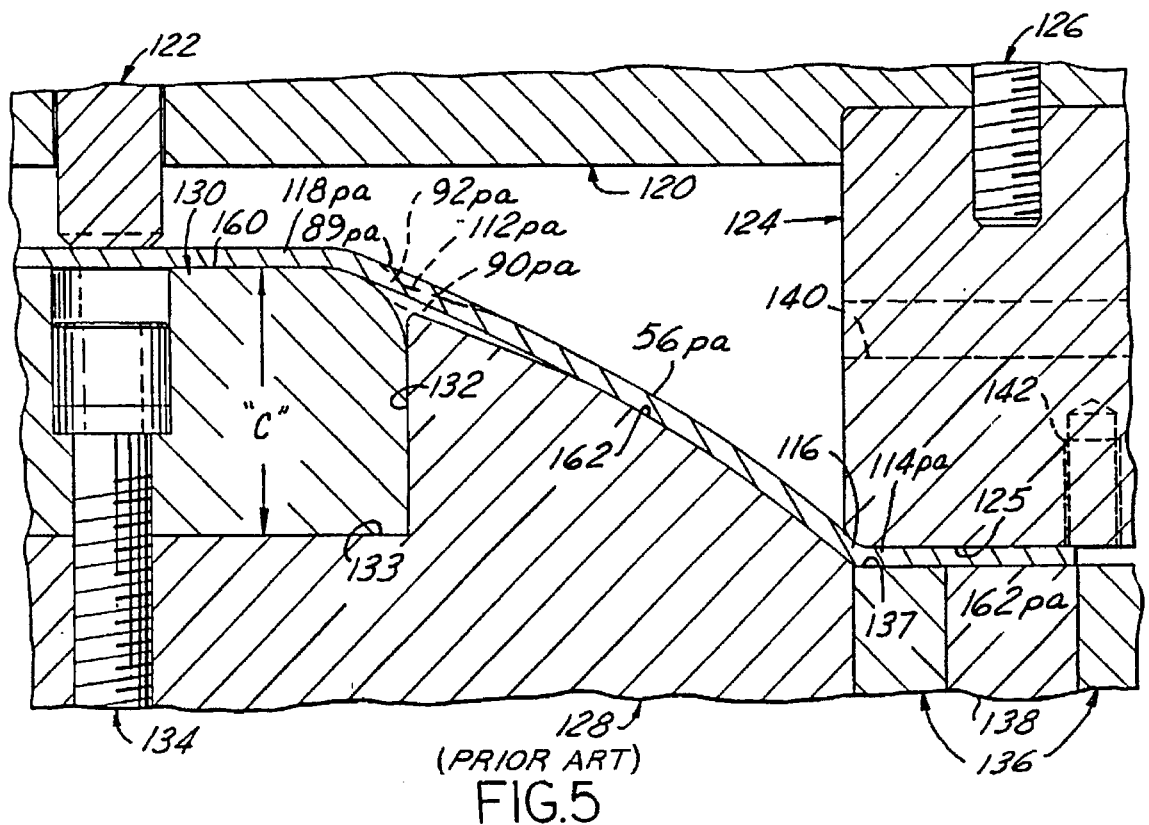
Figure 6:
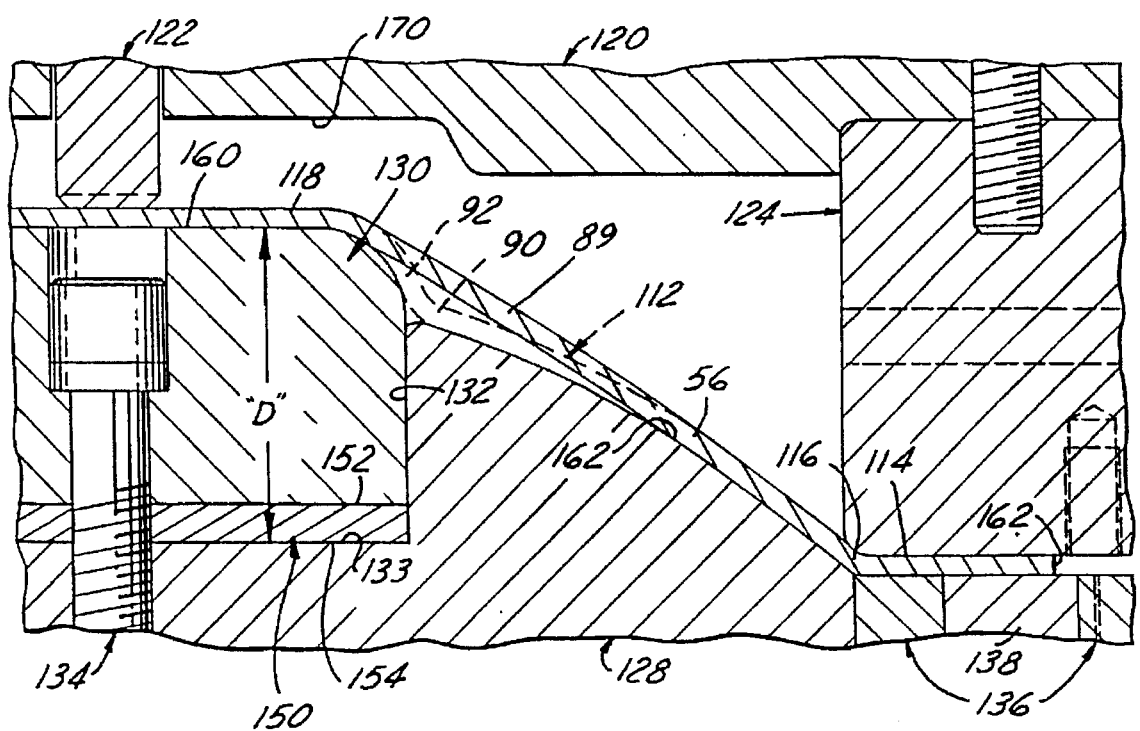
Figure 11:
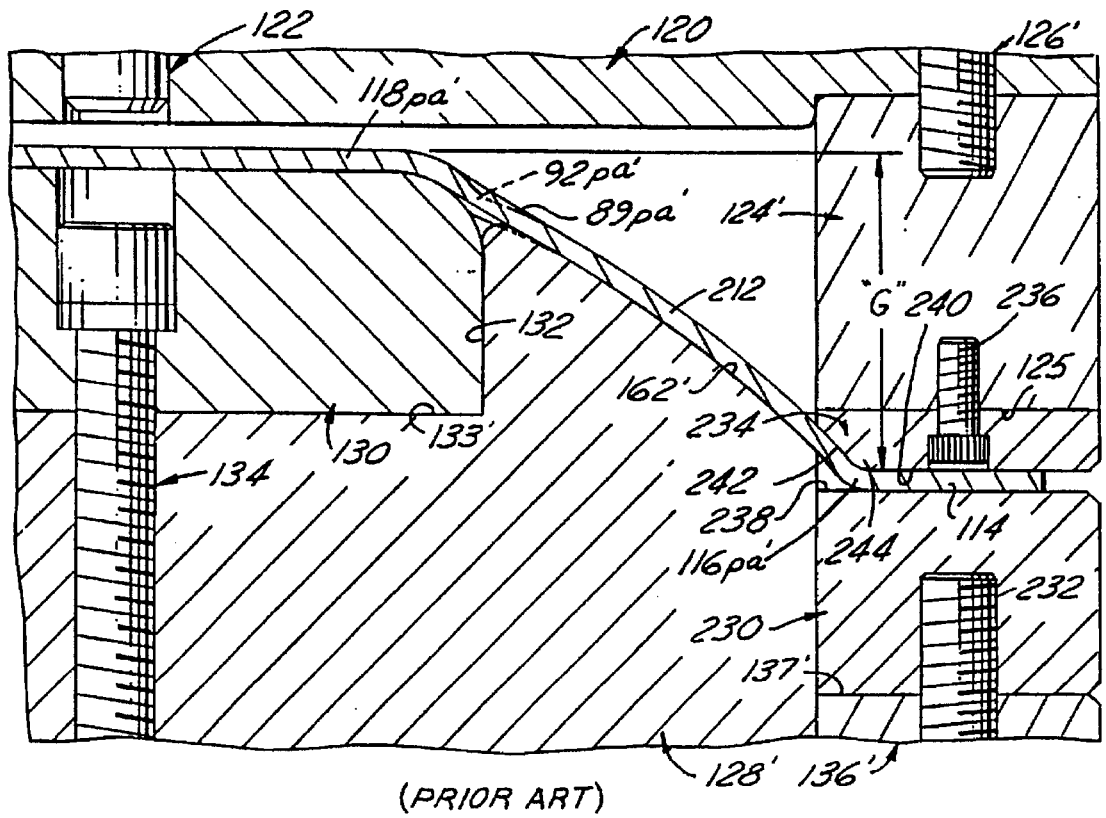
Figure 12:
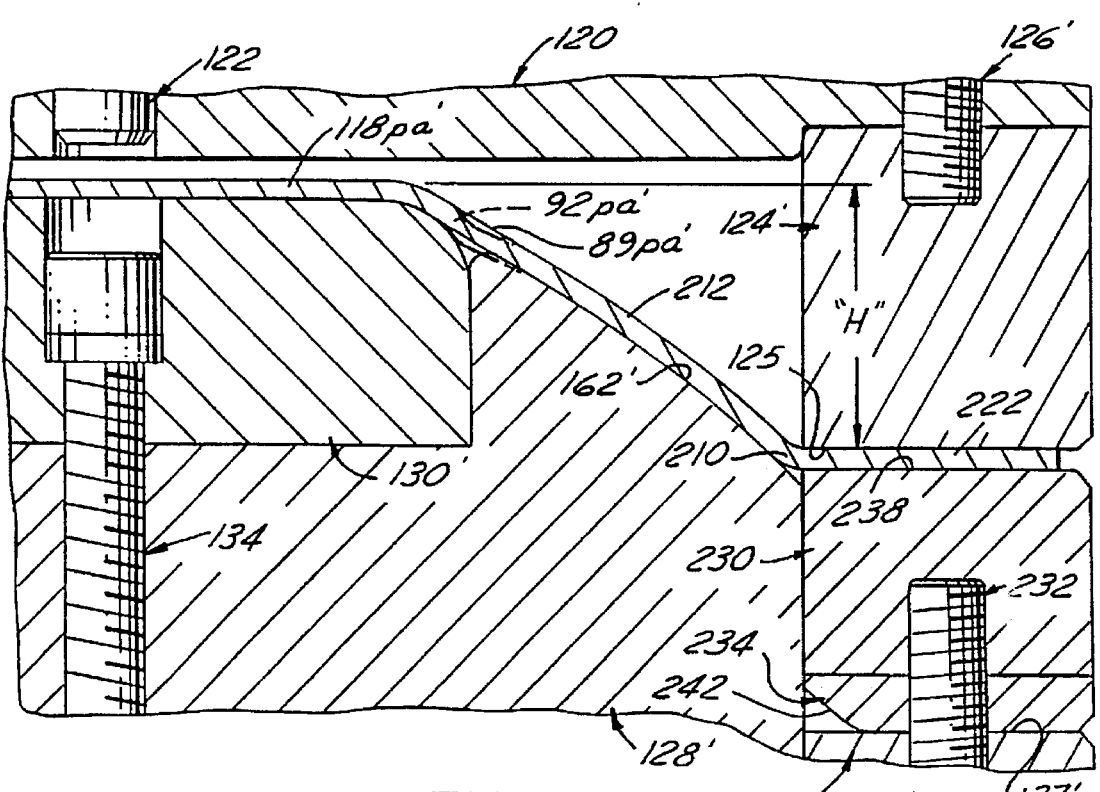

FIG. 4 is a diametrical center cross-sectional view illustrating generally the shape of an intermediate part after completion of the first draw stage operation as well as after a second stage re-forming operation on the blank of FIG. 3 and utilized in forming the disc-rim part of FIGS. 1 and 2, with the corresponding prior art disc-rim intermediate part being illustrated in phantom in FIG. 4 except where superimposed in coincidence on the intermediate part of the invention shown in solid lines in FIG. 4;

FIG. 5 is a fragmentary center cross-sectional view of a portion of the prior art tooling employed in the first draw stage of the multi-stage transfer Dress operation utilized to form the first draw intermediate part of the prior art full face disc-rim part and illustrated partially in phantom in FIG. 4;

FIG. 6 is a view similar to that of FIG. 5 but illustrating the modification of the tooling, in accordance with the method and apparatus of the present invention, to produce the first draw stage intermediate part of the invention shown in solid lines in FIG. 4;

FIG. 7 is a fragmentary elevational view of the outboard side of an exemplary, but preferred, second embodiment of a vehicle wheel constructed in accordance with the present invention;

FIG. 8 is a fragmentary cross-sectional view taken on the line 8—8 of FIG. 7, with the contour of a prior art wheel being illustrated in phantom except where superimposed in coincidence with the second embodiment of the wheel of the invention illustrated in solid lines in FIG. 8;

FIG. 9 is a side elevational view of a flat circular blank of sheet steel illustrating the starting material employed in the method of the invention to form the second embodiment of the full face disc-rim part of the wheel of the present invention;

FIG. 10 is a diametrical center cross-sectional view illustrating the shade of the intermediate part after completion of the first draw stage operation (as well as after a second stage re-forming operation) on the blank of FIG. 9 and utilized in forming the disc-rim part of the modified wheel of FIGS. 7 and 8 in accordance with the method of the invention, again with the corresponding prior art disc-rim intermediate part being illustrated in phantom in FIG. 10 except where superimposed in coincidence on the first draw intermediate part of the invention illustrated in solid lines in FIG. 10;

FIG. 11 is a fragmentary center cross-sectional view of a portion of the prior art tooling employed in the first draw stage of the multi-stage transfer press operation utilized to form the first draw intermediate part of the prior art full face disc-rim part illustrated partially in phantom in FIG. 10; and FIG. 12 is a view similar to that of FIG. 11 but illustrating the modification of tooling, in accordance with the method and apparatus of the invention, utilized to form the second embodiment first stage draw intermediate part of the invention shown in solid lines in FIG. 10.

DETAILED DESCRIPTION OF THE FIRST EMBODIMENT

Referring in more detail to the accompanying drawings, one embodiment of a wheel 20 made in accordance with the method, apparatus and wheel construction of the present invention is shown in FIGS. 1 and 2. Wheel 20 comprises a two-piece assembly made generally in accordance with the Overbeck et al U.S. Pat. No. 4,610,482 and comprises a rim part 22 and a disc-rim part 24 permanently and securely joined together by a circumferentially continuous, air impermeable weld joint 26. Rim 22 is preferably made from strip steel stock by coiling, butt welding and roll forming in a conventional manner so as to provide, as best seen in FIG. 2, an inboard tire bead retaining flange 28, an inboard tire bead seat 30, a safety hump 32, a drop-center well portion 34, an outboard bead seat safety hump 36 and an outboard tire bead seat 38. However, instead of being a "full rim" having an outboard tire-bead retaining flange, rim 22 has at its outboard free edge a radially in-turned flange portion 40 in accordance with the aforementioned Overbeck et al '482 patent, which is incorporated herein by reference.

The disc-rim part 24 of wheel 20 comprises a central bolt circle wheel mounting portion indicated by the bracketed zone 42 in FIG. 2, having a pilot center opening 44 made either concentric with the average axis of bead seats 30 and 38 of wheel 20 or having a predetermined controlled eccentricity relative to bead seats 30 and 38 in accordance with U.S. Pat. Nos. 4,279,287 and 4,354,407. Wheel mounting bolt holes 46, 48, 50, 52 and 54 are provided in a circular array in mounting portion 42 concentric with opening 44. Disc-rim 24 also has an intermediate portion 56 in the form of a bowl-shaped, outwardly concave section integral with and extending radially outwardly and axially outboard from mounting portion 42. Disc-rim portion 56 then extends further radially outwardly and merges integrally with an outer peripheral portion 58 in the form of an outboard tire bead retaining flange portion 60 which extends in a generally radial plane, and a reversally curved outer edge portion 62, portion 58 thus corresponding to the similarly configured inboard rim flange 28. It will thus be seen that disc-rim 24 serves as a so-called "full-face" disc-rim part in that disc-rim 24 does not terminate at a junction with the drop-center well 34 of rim 22, but rather continues radially outwardly beyond the rim outboard free edge to provide the outboard tire bead retaining flange 60 of rim and wheel assembly 20 to thereby achieve the "full face look".

Disc-rim 24 is provided with an annular array of five vent holes 70, 72, 74, 76 and 78 formed in the bowl-shaped portion 56 of the disc-rim. Each of these vent holes may have a marginal flange portion defining the margin of the vent hole and flared in an outboard direction, as indicated by the marginal flange 82 of vent hole 70. A valve stem hole 74 is also provided in disc-rim portion 56 which is aligned with a valve stem hole (not shown) in rim 22.

After each of the disc-rim and rim parts 24 and 22 have been final formed in separate operations, rim 22 is fixtured with edge flange portion 40 in abutment with the inboard surface of disc-rim flange 60 in a suitable assembly fixture of a welding machine. Once rim 22 has been so-fixtured to disc-rim 20 such that the parts assume the relative position shown in FIG. 2, assembly of wheel 20 is completed by permanently affixing rim 22 to disc-rim 24 by forming a circumferentially continuous arc weld (indicated at 27) in the "trench" or asymmetrical groove defined between the outboard sloping surface of flange portion 40 and the inboard surface of disc-rim flange portion 60, as best seen in FIG. 2. The weld joint 26 so-formed is preferably a full penetration flare bevel arc weld so as to securely join the rim and disc-rim together and form an air-tight seal at the junction of these parts. As will be well understood by those skilled in the art, the weld metal bead 27 of the weld joint 26 is indicated somewhat schematically in FIG. 2 inasmuch as the same when illustrated in cross-section in a micrograph would preferably correspond closely to such illustration of the weld joint as shown in FIG. 3 of the aforementioned Overbeck et al '482 patent.

The wheel construction as thus far described thus provides the many features and advantages of the full face rim construction as disclosed and claimed in the Overbeck et al '482 patent. The design flexibility provided to the wheel stylist with respect to such full face wheel constructions can now be seen by comparing the outboard (also variously termed "street side", "curb side" or "beauty side") appearance of the wheel embodiments of FIGS. 1 and 2 with that of FIGS. 7 and 8, and even more so with that of FIGS. 1 and 2 of the Overbeck et al '482 patent. Note for example that the exemplary embodiment illustrated in FIGS. 1 and 2 of the '482 patent has a disc-rim part 14 with relatively deed frusto conical hat section 54 which includes a crown portion 56 for imparting strength and flexability to wheel 10 illustrated therein, similar to the typical hat section found in a "plain Jane" or base wheel type disc-rim.

By contrast, the disc-rim part 24 of the full face wheel 20 illustrated by way of example herein is characterized by the smoothly curved bowl portion 56 in which the vent openings 70–78 are formed. Portion 56 terminates integrally at its inner periphery in a bend portion 90 (FIG. 2) where bowl portion 56 is integrally joined to disc-rim mounting portion 42, which in turn has a frusto conical portion 92 merging integrally at its inner periphery with the bolt circle (mounting pad) portion 94. Bolt holes 46–54 are offset in conventional fashion in the outboard direction from the mounting pad portions 96 disposed circumferentially intermediate the bolt holes. Mounting pads 96 define a circumferentially array of inboard abutment surfaces disposed in a radially plane adapted to abut to a wheel hub, brake hub or other wheel mounting structure of the vehicle in accordance with conventional practice. This radial mounting plane of wheel 20 is indicated by the line numbered 100 in FIG. 2. The "center line" of wheel 20 is indicated by line 102 in FIG. 2, which is defined as a radial plane spaced equidistant from bead retaining flanges 28 and 60 of wheel 20. The "offset" of wheel 20 as illustrated in FIG. 2 is thus the dimension indicated at "B" in a direction axially of wheel 20 and is the distance between the radial planes 102 and 100.

In accordance with a principle feature of the first embodiment of the invention illustrated in FIGS. 1–6, this offset "B" of wheel 20 has purposely been made less than the offset "A", illustrated in like manner FIG. 2 by the mounting plane $100_{pa}$ defined by the mounting ring portion $42_{pa}$ of the prior art full face wheel construction $20_{pa}$. Mounting ring portion $42_{pa}$ is indicated in phantom lines in FIG. 2, whereas the remainder of wheel $20_{pa}$ is conicident with the solid line showing wheel 20 in FIG. 2. It is to be noted that the only structural difference between the prior art wheel $20_{pa}$ and wheel 20 is the shorter axially inboard protrusion and wider angle of incidence of the frusto conical portion $92_{pa}$ of the prior art wheel relative to the axis WA of rotation of wheels 20 and $20_{pa}$ (FIG. 2). Thus the bolt holes, mounting pads and other associated remaining structure of the mounting ring portion $42_{pa}$ of the prior art wheel are identical to that of the corresponding elements of mounting ring 42 of wheel 20. It also is to be noted that the disc-rim bowl portion 56 of wheel 20 and the corresponding disc-rim portion of prior art wheel $20_{pa}$ are identical, as are the vent window openings 70–78 and associated inboard flare curled or marginal vent flanges 82. The outboard appearance of the prior art wheel $20_{pa}$ thus is essentially identical to that of the wheel 20 of the invention even though the prior art wheel $20_{pa}$ and the wheel 20 of the invention differ in their offsets A and B.

Hitherto, if the outboard look of the prior art wheel having offset dimension A were desired to be retained but the same fitted to a vehicle having an offset requirement B, the wheel engineer would have to re-design the contour of portions 56, 42 and 92 by increasing the concavity of portion 56 (i.e., smaller radius of curvature) so as to shift the mounting portion $42_{pa}$ to move its mounting plane $100_{pa}$ over to line 100 to produce the changed offset dimension B. This not only produced an alteration in the outboard appearance of the wheel, but also required the re-tooling of the progressive forming, die stamping and draw tooling in each of the multiple stations of the progressive forming transfer press utilized for making the disc-rim part. This in turn entailed substantial lead time requirements and considerable tooling design, construction, installation and try-out costs, rendering such an offset change in many instances economically impractical. However, in accordance with the present invention such an offset change can be accomplished with greatly reduced tooling design, manufacture, installation and try-out time and expense by employing the improved method and apparatus of the invention for accomplishing these improved results.

In accordance with the method and apparatus of the present invention, in order to produce the disc-rim part 24 of the full face wheel construction 20 of the embodiments of FIGS. 1 and 2, a flat circular blank 110 of sheet metal is first provided as the starting material for feeding to the first stage of a multiple stage transfer press of conventional construction. Typically, blank 110 is made from hot rolled steel strip, although other durable sheet metal materials such as aluminum stock may be also utilized if desired. Blank 110 is progressively formed into disc-rim part 24 in a series of several forming stages carried out successively in a manner well established in the art of manufacturing wheel discs. For example, such successive stages may comprise initial draw, reverse drawing of the center, piercing the center hole, manufacturing the basic shape by final-drawing and then subsequent coining, piercing and calibrating, see for example SAE Paper SP-897 entitled "Autobody Stamping Applications and Analysis" published February, 1992, pages 41–49, and in particular page 47 and 48 thereof.

In making disc-rim 24, preferably the first stage of the multiple stage transfer press operation comprises a first draw stage in which the flat circular blank 110, illustrated in side elevation of FIG. 3, is drawn from the shape shown in FIG. 3 generally into the shape shown in cross section in solid lines in FIG. 4 to thereby form an intermediate part 112. For comparison purposes in FIG. 4 the shade of the intermediate part $112_{pa}$ of the prior art disc-rim $24_{pa}$ of prior art wheel $20_{pa}$ is shown superimposed on part 112 except for the central area of the part indicated in phantom in FIG. 4. It will be seen that the central area of the blank which is to become the mounting ring portion 42 is formed in this first draw stage as a flat bottom saucer shape offset inboard (upwardly as viewed in FIG. 4) from the bowl portion 56 of part 112. The outer peripheral margin portion of blank 110, indicated at 114 in FIG. 4, and which is to be further formed into the outboard flange portion 58 of disc-rim 24 in successive stages of the transfer press, is maintained in the original flat condition in the stage of FIG. 4 so as to remain extending in a radial plane at the completion of this stage. The bend at 116 formed at the junction of marginal portion 114 and bowl portion 56 essentially remains unchanged in subsequent disc-rim forming stages and forms the bend between portions 56 and 58 of disc-rim 24 also indicated at 116 in FIG. 2. In addition the frusto conical portion 92 of mounting ring portion 42 is also pre-formed at this stage.

However bend 90 of disc-rim 24 is formed in the next following reforming stage and then remains unchanged in the subsequent disc-rim forming stages from its configuration shown in solid lines in FIG. 4. Also, the central offset portion 118 of intermediate part 112 is a pre-form at this stage and is flat and imperforate, and is generally drawn to an inboard limit dimension corresponding to the offset dimension B of FIG. 2. By contrast, the central portion $118_{pa}$ of the prior art first stage intermediate part $112_{pa}$ is drawn to a shallower offset corresponding to the offset dimension A of FIG. 2.

In order to perform this first stage draw operation to produce the intermediate part $112_{pa}$ of the prior art wheel $20_{pa}$, conventional die draw tooling is employed as partially illustrated in the fragmentary cross-sectional view of FIG. 5. FIG. 5 illustrates in half-section (and in solid line cross section) the intermediate part $112_{pa}$ as configured at the completion of this first draw stage. The draw die tooling is likewise illustrated in this final position at the completion of the forming operation in this first stage. As will be well understood by those skilled in the art, the draw die tooling of FIG. 5 is conventional and comprises a upper die shoe or punch holder 120, a movable ejector pin 122 positioned centrally of upper die shoe 120, an outer punch ring 124 secured by bolts 126 to shoe 120, a lower die plug 128, a center dome insert 130 closely received and seated in a large central recess or socket 132 in die plug 128, an Allen head bolt 134 which removably secures insert 130 on die plug 128, a ring like die pad 136 encircling die plug 128 and movable axially relative thereto, and a series of lifter fingers 138 operable as ejectors and movable relative to die pad 136 and lower die plug 128. Suitable air vents 140 may be provided in lower punch ring 124, as well as threaded sockets 142 to facilitate lifting of part 124 during tooling changes.

The operation of the prior art tooling of FIG. 5 is conventional and well understood in the art. Blank 110 is automatically fed into position with the tooling open such that blank 110 is centered with its axis aligned with the axis of insert 130. Die shoe 120 is then lowered to bring lower surface 125 of punch ring 124 into contact with the upper surface of blank 110, and die pad 136 is in raised position to bring its upper surface 137 against the underside of blank 110 such that the outer periphery of the blank is tightly gripped between these opposing die members prior to forming of blank 110. With the outer margin of the blank so gripped, outer punch ring 124 and die pad 136 move downward together as viewed in FIG. 5 to draw blank 110 downwardly and form the same against most of the contacting or working surface 160 and 162 of insert 130 and die plug 128 respectively to thereby cold work blank 110 mostly into the configuration of the prior art intermediate part $112_{pa}$ as shown in FIG. 5. It is well understood in this art this first stage draw operation involves a compound bending and stretching operation which leaves a portion $89_{pa}$ spaced away from the areas of working surfaces 160 and 162 where they converge with one another. Portion $89_{pa}$ of the intermediate part thus must be re-formed in the second stage operation of the transfer press into the configuration of bend $90_{pa}$ and frusto conical portion $92_{pa}$ as shown in broken lines in FIG. 5. This is done by a conventional upper die part ring (not shown) which has a working surface configured complemental to working surface 162 of die plug 128 and terminates at its inner periphery slightly radially outwardly of insert 130 so as to bend and draw portion $89_{pa}$ into the final configuration of portions $90_{pa}$ and 92a.

Upper die shoe 120 is then raised clear of intermediate part $112_{pa}$, and lower die plug 128 is lowered while part $112_{pa}$ is retained in position by the lifter or ejector pins 138. Die pad 136 is also retracted or lowered from the position as viewed in FIG. 5 in the opening of the tooling after part forming. Intermediate part $112_{pa}$ is then removed automatically from the first stage of the transfer press by a conventional transfer mechanism incorporated therein and transferred into the next forming stage of the transfer press.

The successive forming stages in the transfer mechanism may likewise be those conventionally employed to progressively form disc-rim part $24_{pa}$, and may comprise the aforementioned second stage reforming operation to form the final configuration of portions $90_{pa}$ and $92_{pa}$, as well as a reverse forming operation in which the mounting pads, bolt hole bosses and hub cap mounting openings are formed in the portion $42_{pa}$, a center preform opening also may be pierced, followed by a disc-rim window or vent piercing stage, then a vent flare forming stage, an O.D. trim and stamp stage, an edge forming stage in which flange portion $62_{pa}$ is bent from portion $60_{pa}$ and portion $60_{pa}$ restruck, and finally a stage in which the formed edge flange is restruck and a locating center opening pierced in the center portion $42_{pa}$. It will be understood that this particular sequence of transfer press forming operations is by way of illustration and not by way of limitation, and is varied by those skilled in the art to empirically meet the forming requirements presented by any particular wheel design.

After disc-rim part $24_{pa}$ is thus fully shaped, it is ready for assembly to rim 22 by welding, after which the rim and disc-rim assembly is further processed in a pierce-after operation to form the bolt holes $54_{pa}$ and center pilot opening $44_{pa}$, as is also well understood in the art. However, if desired, transfer press stages and tooling may be suitably modified to perform "pierce-before" type forming operations so as to finish form the bolt holes and center opening prior to the disc-rim part being assembled to rim 22 also in accordance with conventional wheel-disc-forming practices.

In accordance with the principle feature of the present invention, in order to change the offset of the prior art disc-rim part 20 of the prior art wheel $20_{pa}$ from the original design offset A, to a smaller offset dimension B illustrated in FIG. 2, the conventional first stage tooling in FIG. 5 is altered by the addition of only one simple part, namely a customized spacer disc-rim 150 illustrated in FIG. 6. Spacer 150 is a flat circular disc-rim centrally apertured to receive bolt 134 therethrough and diametrically dimensioned to seat closely within socket 132 against its flat bottom surface 133 in lower die plug 128. In accordance with the invention, the thickness dimension of spacer 150 (the distance axially of spacer 150 between its opposed faces 152 and 154) is made equal to the difference between the respective old and new offset dimensions A and B. Spacer 150 is inserted beneath insert 130 and insert 130 is tightly clamped against spacer 150 by bolt 134 as shown in FIG. 6. Spacer 150 when so inserted thus elevates the upper working surface 160 of insert 130 a distance corresponding to the thickness of spacer 150. The axial dimension C' of insert 130 labeled in FIG. 5 is thereby effectively increased to the dimension indicated D' in FIG. 6 wherein D' is equal to C' plus the thickness of spacer 150. Hence the center portion 118 of part 112 is form-shifted inboard (upwardly as viewed in FIG. 6) a like distance to thereby introduce the offset difference indicated between the prior and new center portions 118 and $118_{pa}$ illustrated in FIG. 4.

Due to this increased dimension D' , the portion 89 of part 112 is elongated relative to the portion $89_{pa}$ of the prior art part $112_{pa}$. This also results in the outer marginal edge 162 of part 112 (FIG. 6) being contracted to a smaller outside diameter relative to the outer peripheral edge $162_{pa}$ of part $112_{pa}$ (FIG. 5) (assuming the O.D. of the starting blank 110 is left unchanged from that of the blank 110 utilized in the prior art tooling of FIG. 5). This slight diametrical shrinking may be within the limits established to accommodate the further downstream stages of the transfer press operations for small offset differences between dimensions A and B. However, for larger variations in wheel offset imparted in accordance with the method and apparatus of the invention, a corresponding increase in the outside diameter of blank 110 may be calculated in accordance with conventional die-draw design practices and/or by empirical try-out, as is well understood in the art.

In any event, it will be seen that the remaining portions 90, 56, 116 and 114 of part 112 remain unchanged in configuration as compared to the prior art part $112_{pa}$ despite the increase in the offset introduced in the modified tooling of FIG. 6.

In accordance with the invention it has been found that the offset change introduced by the simple addition of the spacer 150 to the tooling in the first draw stage as shown in FIG. 6 of the transfer press operation is the only forming stage for which the spacer thickness needs to be designed in order to accomplish the offset change. Accordingly, in the downstream stages indicated previously, the forming tooling engaging the intermediate part 112 as it is further worked in the various portions of disc-rim part 24 need only be altered in the same manner and magnitude as the tooling in the first stage as shown in FIG. 6. Accordingly, this may be readily accomplished by elevating the corresponding center tooling inserts where they exist in these stages by individually mounting under the same spacers having the same thickness dimension as spacer 150 so that the offset shift initially introduced in the first stage is maintained in the tooling of the downstream progressive stages.

Likewise, in those downstream stages having tooling intended to engage the center mounting pad zone 42 of the disc-rim being worked, one or more similar "upper" spacers (not shown) may be employed between such base tooling and their supporting structure (e.g., upper die shoe 120). A minimum axially dimension is selected for such upper base tooling, similar to the minimum axial dimension A of insert 130 (i.e., the corresponding "lower base tooling"), and a maximum dimension upper spacer inserted when forming a maximum offset wheel. When tooling is to be changed to decrease wheel offset, an upper spacer or spacers are then removed to shift the base upper tooling upwardly by the same amount as insert 130 is shifted upwardly by inserting spacer 150 therebeneath.

However, the upper tooling ring described previously to form bend 90 and frusto conical portion 92 in the second stage final formation of intermediate part 112 of FIG. 6 need not be modified or shifted to accommodate the shift of insert 130 by spacer 150 because of the aforementioned pre-existing working radial clearance between such upper tooling ring and insert 130.

In the event additional clearance is needed to accommodate the offset shift in the disc-rim part, a clearance cavity 170 (FIG. 6) may be formed in the lower face of upper die shoe or punch holder 126. Similar clearances may also be provided, if needed or desired, in downstream transfer press stages. However, this modification will only be needed as to conversion of certain existing transfer press lines to practice the invention, and would be designed into any new tooling intended to accommodate wheel offset variations.

In view of the foregoing description, it will now be understood that the apparatus and method of the present invention to form the first embodiment wheel 20 of the invention incorporating the reduced offset dimension B is accomplished without the need to redesign and manufacture a new or different lower die plug 128 and associated center dome insert 132 for the first draw stage. Instead only an inexpensive spacer 150 need be designed, made and assembled beneath insert 130, and corresponding spacers of like thickness then made and assembled where needed in downstream stages. Likewise, similar minimal modifications need be made to the tooling inserts carried in upper die shoe 120, and corrollary spacers removed from the upper die shoe to accommodate insertion of lower tooling spacers, such as spacer 150, in lower die plug 128. Of course, in those stages where the upper die shoe tooling does not engage disc-rim mounting pad portion 42, no upper tooling modification is required.

Hence, as will be appreciated by those skilled in the art, the cost of making and installing spacer 150, and its downstream counterparts as well as upper tooling counterparts and corrollary spacers, is insignificant when compared to the costs of design, manufacture and trial of retooling parts 128 and 130 and like efforts for retooling in the downstream stages. It will also be understood that further reductions in the offset dimension B of the disc-rim 24 can be accomplished by utilizing a spacer 150 having a greater thickness than that shown in FIG. 6, with like thickness changes in the spacers employed downstream in the subsequent progressive forming the stages of the transfer press. Of course, there are practical limits as to the magnitude of the difference between offsets A and B which can be accomplished without seriously altering the performance characteristics of disc-rim 24 in the operation of wheel 20. For example, for a wheel 20 having the following general specifications the amount of change of offset reduction which is accomplished in accordance with the process and apparatus of the present invention is one-quarter (¼") of an inch.

The following parameters are presently believed to be those to be observed in achieving one practical working example of a wheel construction 20 constructed in accordance with the present invention:

| | |
|---|---|
| Decreased Offset B | .75" |
| Offset A | 1.0" |
| Diameter of blank 110 | 18.8" |
| Thickness of blank 110 | .180" |
| Material of blank 110 | S.A.E. Grade 1015 |
| Wheel size designation | 15 × 7 |
| Radial distance from axis WA to bend junction 116 | 14.30" |

| | |
|---|---|
| Axial distance from mounting face plane to flange 60 (or 114) | 2.49" |
| Radius of curvature of bowl portion 56 | 10.74" |

Preferably, when implementing the first embodiment of the invention, a bowl-type disc-rim configuration is employed, as exemplified by wheel 20, and a "base" disc-rim design is engineered in accordance with the established automotive wheel design principles to provide a disc-rim part having the maximum possible offset, such as offset A, as limited by the need to retain a minimum amount of curvature in bowl portion 56, i.e., preserving a maximum limit for the radius of curvature of bowl 56 to maintain strength-to-weight requirements in the wheel assembly as well as other desireable performance parameters imparted by the bowl-like geometry as distinguished from a flatter disc-rim type geometry, as is well understood in the art. Then, if a given wheel design styling imparted to this base full-face wheel disc-rim design is desired to be employed or retained for use on a range of vehicles having different wheel offset requirements, offset dimension B can be reduced within a range of about ¾ of an inch less than offset dimension A. Such offset reduction can be accomplished within this range without thereby requiring a change in the configuration of the working face 160 of insert 130 shown in FIGS. 5 and 6. Also with these parameters established, it is possible, if desired, to specify a minimum outside diameter of the starting blank 110 for a given wheel part number design to enable a variety of selected offset reductions in the aforementioned range to be produced from a given specified starting blank. Alternatively, the optimum blank diameter for each differing offset specification can also be specified and provided for each given wheel disc-rim run, depending upon the production costs and economy trade offs for any given wheel making facility. In addition, the stock thickness for starting blank 110 may be established at some maximum design value for the maximum offset reduction within certain design limits inasmuch as the typical tooling utilized in the progressive transfer press can accommodate variations in stock thickness of plus or minus 0.005 inches.

It is also to be noted that even though there is a change in appearance between the prior art wheel $20_{pa}$ and new wheel 20 as respects the center area $42_{pa}$ versus the center area 42, i.e., the mounting pad and bolt circle zone is pushed farther inboard and the frusto conical portion 92 is elongated, this appearance change is difficult to detect in most if not all instances by the eye of the ordinary observer and, moreover, will not be detectable because of being hidden by the usual decorative center cap removably attached to cover this area in vehicle usage of wheel

DETAILED DESCRIPTION OF SECOND EMBODIMENT

A second embodiment of a wheel 200 made in accordance with the method, apparatus and wheel construction of the present invention is shown in FIGS. 7 and 8. Wheel 200, like wheel 20, comprises a two-piece assembly made generally in accordance with the aforementioned Overbeck et al '482 patent, and may utilize the same rim part 22 as well as the same full penetration flare bevel weld joint 26 described hereinabove. However, the disc-rim part 202 of wheel 200 is modified relative to disc-rim part 24 of wheel 20 in order to introduce, in a somewhat different manner, the potential for varying the offset dimension of the full face wheel. In wheel 200 the configuration of disc-rim 202 is varied in the outboard tire bead retaining flange area 204 of disc-rim 202 instead of varying the configuration of the central mounting pad area $42_{pa}$ of disc-rim 202. For purposes of illustration, this mounting pad area $42_{pa}$ is similar to that described with reference to the prior art full face wheel $20_{pa}$ described in conjunction with FIGS. 2 and 4 and hence like reference numerals with a prime suffix are employed in FIGS. 7 and 8 and the description of such elements not repeated. In FIG. 8 disc-rim 202 of wheel 200 is shown coincident and therefore superimposed upon the illustration of the disc-rim $24_{pa'}$ of a prior art wheel $20_{pa'}$ similar to prior art wheel 20 pa illustrated and described with reference to FIG. 2. Also, the offset dimension of the prior art wheel $20_{pa'}$ is again shown as the distance E axially of wheel $20_{pa'}$ from the mounting plane $100_{pa}$ of wheel $20_{pa'}$ and the center line $102_{pa}$ of wheel $20_{pa'}$.

In accordance with the principle feature of the second embodiment of the invention, the offset of the wheel 200 may be varied from offset E in increasing magnitude, such as to the greater dimension F illustrated in FIG. 8 which is the offset of the mounting plane of wheel 200 to the center line 206 of wheel 200. This variable increased offset is imparted to wheel 200 by increasing the dimension, radially of the wheel 200, of the radially extending flange portion 208 of disc-rim part 202. Hence the bend portion 210 at the junction of flange portion 208 and the bowl portion 212 of wheel 200 is moved radially inwardly so as to be closer to the axis of rotation WA of wheel 200 to thereby shorten by a like amount the radial extent of the bowl portion 212 of disc-rim 202. It will be seen that moving the flange-to-bowl bend junction $116_{pa}$ radially inwardly along the bowl portion $56_{pa}$ by the amount shown in FIG. 8 to the new flange-bowl junction 210, rim 22 is shifted inboard (to the right as viewed in FIG. 8) from the position of the rim $22_{pa}$ of prior art wheel $20_{pa}$ so as to shift the center line 206 of rim 22 of wheel 200 by a distance equal to the new offset dimension F minus the prior art offset dimension E.

In order to provide this increased offset dimension F of wheel 200 in accordance with the method and apparatus of the present invention, the starting blank 110 (FIG. 9) is formed into an intermediate part 220, shown in solid lines in FIG. 10, in the first draw stage and second reforming stage of the progressive disc-rim forming stages of a conventional transfer press which has been modified in accordance with the invention. Note that the modification to intermediate part 220 versus intermediate part $112_{pa}$ occurs in the shift of the bend junction $116_{pa}$ radially inwardly of the wheel disc-rim 202 to the new bend junction 210 between bowl portion 212 and the planar radially extending marginal portion 222 of intermediate part 220. This forming modification thus slightly increases the outside diameter of intermediate part 220 relative to that of intermediate part $112_{pa}$.

The prior art tooling employed in the first stage of the transfer press operation to form intermediate part $112_{pa}$ is partially illustrated in the fragmentary half-sectional view of FIG. 11, wherein elements identical to those described in conjunction with FIG. 5 are given identical reference numerals, and elements differing in dimensions but corresponding in function are given identical reference numerals raised by a prime suffix, and the description thereof not repeated.

Referring to FIG. 11, the first stage transfer press tooling of the second embodiment includes an upper die shoe or punch holder 120', an ejector pin 122, an outer punch ring 124' secured by studs 126' to upper die shoe 120', a lower die plug 128' and a center dome insert 130' seated in a pocket 132' of lower die plug 128' and fastened therein by an allen head bolt 134. A die pad ring 136' and ejectors 138 (not shown) are also included in the second embodiment.

The first stage tooling for making the second embodiment wheel 200 illustrated in FIGS. 11 and 12 differs from the tooling of FIGS. 5 and 6 utilized to make the first embodiment wheel 20 in certain respects. Since wheel 200 is a somewhat different wheel design from wheel 20, including the curvature of the bowl portion 212 of wheel 200 as well as diameter of the mounting pad region $42_{pa}$, the dimensions of center dome insert 130' differ from that of insert 130, and the curvature of working surface 162' differs from that of working surface 162 of the respective lower die plugs 128' and 128. In addition, the outside diameter of lower die plug 128' is modified relative to that plug 128 in the sense that the outer periphery of plug 128' is reduced in diameter by an amount corresponding to the distance taken in the radial plane of the wheel between the bend junction $116_{pa'}$ of the prior art wheel $20_{pa'}$ and the bend junction 210 of wheel 200. The corresponding dimensions of outer punch ring 124' and die pad ring 136' are likewise so sized to mate with the modified lower die plug 128'.

The apparatus of FIGS. 11 and 12 also differs from that of 5 and 6 in that die pad 136' carries on a separate surface a die pad ring 230 removably secured to die pad 136' by annular row of bolts 232. Also, outer punch ring 124' carries a spacer ring 234 removably secured to the lower face 125' of die pad 124' by bolts 236. The upper working face 238 of die pad ring 230 is a flat planar surface. However, the working face 240 of spacer ring 234 is chamfered at 242 to a form complimental to the upper or inboard surface of disc-rim 202 such that bend $116_{pa'}$ can form around the shoulder 244 defined between spacer surfaces 240 and 242 during the first draw operation. It is to be noted that the thickness of spacer ring 234 between its working face 240 and its mounting face 244 is predetermined to correspond to the difference between the original offset dimension E and the increased offset dimension F of wheels $20_{pa'}$ and 200 respectively.

In the operation of the apparatus of FIG. 11, the outer punch ring 124', with spacer 234 affixed thereto, operates in conjunction with die pad 136', with ring 230 affixed thereto, in the same manner described previously with respect to the outer punch ring 124 and die pad 136 described in conjunction with FIGS. 5 and 6. Hence the flat starting blank 110 is drawn in the first stage operation to the form shown in solid cross section lines in FIG. 11 to thereby place the bend junction $116_{pa'}$ at the location of disc-rim $24_{pa}$ shown in FIG. 7. The finish forming of the conical portion $92_{pa'}$ as shown in dotted lines in FIG. 11, as well as in FIG. 10, is again accomplished in the second stage by the aforementioned forming ring in the same manner as described in conjunction with FIGS. 5 and 6. After the further working of the intermediate part in the downstream progressive transfer press operations, the disc-rim $24_{pa}$ (shown in part phantom, part solid in FIG. 8) is formed in the same manner as described previously in conjunction with disc-rim 24 described with reference to FIGS. 1 through 6. When assembled to rim $22_{pa}$ as shown in phantom in FIG. 8, the offset of this prior art wheel is indicated by the offset dimension E in FIG. 8.

In order to increase the offset dimension of this full face wheel design was to provide the offset F illustrated in FIG. 8 in accordance with the invention, the tooling set up is changed by removing spacer 234 from punch ring 124' so as to expose the lower face thereof 125' as a working surface. Then die ring 230 is removed from die pad 136' and the spacer 234 installed on the upper surface 137' of pad 136'. Ring 230 is reinstalled on top of spacer 234 and both clamped to die pad 136' by the bolts 232. With this changed set up in place, the first stage of the transfer press operation in the same manner as described with reference to the set up of FIG. 11. However the effective working surface 125' of outer punch ring 124' has now been shifted upwardly a predetermined distance corresponding to the difference between dimension G and H indicated in FIGS. 11 and 12 by reason of shifting spacer 234 beneath pad ring 230. This tooling shift thus corresponds to the difference in offset between the offset dimension E and the offset dimension F illustrated in FIG. 8. The repositioning of working faces 125' and 238 relative to die plug 128' is effective to shift the bend junction from the location $116_{pa'}$ illustrated in FIG. 11 to the location 210 shown in FIG. 12 to thereby impart the wheel offset shift seen in FIG. 8 caused by shifting the bend junction radially inwardly of the wheel front $116_{pa'}$ to 210.

For offset increase spacer variations ranging between the G and H dimensions, spacer 234 is suitably modified by changing the chamfer 242 and thickness of the spacer to provide bend junction locations intermediate junctions $116_{pa'}$ and 210', as will be now understood by those skilled in the art from the foregoing description.

For downstream operations involving further forming or other tooling engagement operations relative to the area of flange 208 of disc-rim 202, similar adjustments are readily provided by means of corrollary spacers in like manner.

It will thus be seen that the second embodiment wheel 200 of the present invention, and the method and apparatus for making the same in accordance with the invention, enables the offset dimension of a full face wheel construction to be varied in an increasing direction with only minor tooling changes as compared to the redesigning, manufacturing, installing and try-out of a revised punch and die set tooling to make a similar appearing full face wheel with a revised disc-rim bowl portion to meet the changed offset requirement. Although there is more of a noticable difference in the appearance between the prior art wheel $20_{pa}$ and the increased offset wheel 200 due to bend junction 210 being moved radially inwardly from the original bend junction $116_{pa}$ in disc-rim 202, the bend junction 210 is still disposed radially outwardly of the outer peripheries of the wheel vent openings 70–78 which in turn constitute the dominant structural features, in addition to the bowl configuration of the disc-rim, which impart the distinctive styling appearance to the outboard side of the wheel. In addition, the radially-outermost margins of wheel vent openings 70–78 may be re-designed to move the same slightly radially inwardly of disc-rim 202 (compare FIGS. 1 and 7) to accommodate the re-location of the bend junction 210 relative to bend junction $116_{pa}$. Although these slight differences may be noticable to a trained observer, the manufacturing economy provided by the wheel construction and the method and apparatus for making the same in accordance with the second embodiment of the invention in many applications greatly outweigh this slight disadvantage from the styling standpoint.

In one working example of wheel construction 200 constructed in accordance with the present invention, and utilizing the prior art wheel $20_{pa}$ of FIG. 2 as the starting point and selecting flange 60 as the zone of disc-rim 24 to be axially shifted to increase the wheel offset dimension in the manner of FIGS. 7–12 described hereinabove, the following parameters were observed to achieve a successful wheel meeting O.E.M. fatigue test requirements:

| | |
|---|---|
| Increased Offset "F" | 1.25" |
| Offset "E" of prior art wheel 20 pa | 1.00" |
| Diameter of blank 110 | 18.8" |
| Thickness of blank 110 | .180" |
| Material of blank 110 | S.A.E. Grade 1015 |
| Wheel size designation 200 | 15 × 7 |
| Radial distance from axis WA to bend junction 220 | 13.71" |
| Axial distance from mounting face plane to flange 208 (or 222) | 2.24" |
| Radius of curvature of bowl portion 212 | 10.74" |

In full face wheel constructions generally following the above parameters in a design of the type shown in FIGS. 7 and 8, it is believed that the range of increased offset from dimension E to a maximum increased offset dimension F is generally three-quarter (¾") of an inch.

It is also to be understood that the variable full face wheel offset method, apparatus and wheel construction of the present invention for both embodiments of the wheels 20 and 200 is not generally constrained to the type of wheel full face construction illustrated in FIGS. 1, 2, 7 and 8, i.e., a "bowl-type" disc-rim part as distinguished from the "hat-section" type of disc-rim shown in the Overbeck '482 patent. Nevertheless, such bowl-type disc-rim part configuration (e.g., having a radius of curvature ranging about 10.50 to 11.00 inches) is believed to optimize the wheel strength-to-weight ratio and hence many popular full face steel wheel designs fall into such "bowl-type" disc-rim configuration (with both concavity and convexity in portions 56 and 212). Such bowl-type disc-rim part full face wheel designs are thus preferred for application of the offset wheel change principles of the present invention from the standpoint of minimizing reduction in the strength-to-weight ratio by imparting the offset change. Even within such preferred geometry there remains a fairly large field for application of the offset variation obtainable by utilizing the wheel construction, method and apparatus of the present invention.

It will of course, be understood that other configurations may be imparted to disc-rim 20 and 200 to vary the ornamental appearance thereof in accordance with a variety of styled steel wheel designs while still retaining the characteristic features and advantage of the invention as described above.

For example, referring to the full-face wheel type illustrated in the aforementioned Overbeck et al U.S. Pat. No. 4,610,482, the wheel offset may be increased in this type of disc-rim configuration preferably by shifting the wheel mounting portion 40 in an outboard direction by suitably modifying the forming tooling for this disc-rim center zone in accordance with the principles of the invention as described hereinabove.

In addition, the offset wheel change described in conjunction with wheels 20 and 200 may be respectively reversed in direction, i.e., increasing the offset of wheel 20 by a "center shift" or decreasing the offset of wheel 200 by a "flange shift" assuming wheels 20 and 200 are to be utilized as the starting or "standard" wheel design and a customer offset change range therefrom is contemplated or predicted.

Moreover, both the "center shift" and "flange shift" features may be combined in varying proportions to change the wheel offset of a given full-face wheel design by suitably modifying both the center-zone and flange zone tooling in accordance with the present invention.

It is also to be understood that, although the foregoing description and drawings describe and illustrate in detail various preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

We claim:

1. In an automotive passenger vehicle full face wheel construction having a disc-rim fabricated from sheet metal and including a central bolt circle mounting portion, an intermediate portion extending generally radially outwardly from said bolt circle mounting portion and an outer peripheral portion surrounding said intermediate portion, said disc-rim outer peripheral portion being formed to provide an outboard tire bead retaining flange for said wheel, and a rim part including an inboard tire bead retaining flange, an inboard tire bead seat portion, a drop-center well portion, an outboard bead seat portion, and a rim edge portion extending circumferentially continuously around the rim edge adjacent said rim outboard bead seat, said rim and disc-rim parts being permanently joined by a circumferentially continuous weld formed at a junction of said rim edge portion and said disc-rim outer peripheral portion, the improvement wherein said intermediate portion of said disc-rim has a generally bowl-like shade concave in an outboard direction of said wheel and having a radius of curvature in the range of about 10.50 to about 11.00 inches, said central bolt circle mounting portion of said disc-rim comprising a mounting pad and bolt circle array having an array of inboard facing surfaces defining a mounting plane of said wheel and adapted to abut a wheel mounting part of a vehicle in the mounted condition of said wheel on said vehicle, said bolt circle mounting portion also having a frusto conical transition portion divergent in an outboard direction from said mounting pad portion and joined integrally with said bowl portion by an annular bend portion, the distance axially of said wheel between said transition bend portion and said wheel mounting portion mounting plane being in the range of about 0.75 to 1.50 inches.

2. The automotive passenger vehicle full face wheel construction set forth in claim 1 wherein said rim part includes a radially in-turned rim edge flange extending circumferentially continuously around said rim edge portion adjacent said rim outboard bead seat, said rim edge flange having a generally radially extending abutment surface at the outboard extremity thereof, said disc-rim outboard flange having a generally radially extending rim mating surface disposed in abutment with said rim edge abutment surface, said rim edge flange having a radially inwardly sloping surface extending between said rim outboard bead seat and said rim edge abutment surface and defining with said disc-rim outboard flange a trench disposed radially inwardly of said rim outboard bead seat, said rim and disc-rim parts being permanently joined by a circumferentially continuous weld formed in said trench.

3. In an automotive passenger vehicle full face wheel construction having a disc-rim fabricated from sheet metal and including a central bolt circle mounting portion, an intermediate portion extending generally radially outwardly from said bolt circle mounting portion and an outer peripheral portion surrounding said intermediate portion, said disc-rim outer peripheral portion being formed to provide an outboard tire bead retaining flange for said wheel, and a rim part including an inboard tire bead retaining flange, an inboard tire bead seat portion, a drop-center well portion and an outboard bead seat portion, said outboard edge of said rim part comprises a rim edge portion extending circumferentially continuously around the rim edge adjacent said rim outboard bead seat, said rim and disc-rim parts being permanently joined by a circumferentially continuous weld formed at a junction of said rim edge portion and said disc-rim outer peripheral portion, the improvement wherein said intermediate portion of said disc-rim has a bowl-like configuration concave in an outboard direction and is integrally joined to said disc-rim outer peripheral portion at a bend junction disposed radially inwardly from the inner periphery of said rim edge flange portion a distance in the range of about 14.30 to 13.71 inches, said bowl portion of said disc-rim having a radius of curvature ranging between about 10.50 to 11.00 inches and said wheel having an offset dimension ranging between about 1.0 to 1.25 inches.

4. The automotive passenger vehicle full face wheel construction set forth in claim 3 wherein said rim part includes a radially in-turned rim edge flange extending circumferentially continuously around the rim edge portion adjacent said rim outboard bead seat, said rim edge flange having a generally radially extending abutment surface at the outboard extremity thereof, said disc-rim outboard flange having a generally radially extending rim mating surface disposed in abutment with said rim edge abutment surface, said rim edge flange having a radially inwardly sloping surface extending between said rim outboard bead seat and said rim edge abutment surface and defining with said disc-rim outboard flange a trench disposed radially inwardly of said rim outboard bead seat, said rim and disc-rim parts being permanently joined by a circumferentially continuous weld formed in said trench.

* * * * *